United States Patent
Holms et al.

(10) Patent No.: US 7,946,250 B2
(45) Date of Patent: *May 24, 2011

(54) DUAL-PURPOSE JAR-AQUARIUM

(76) Inventors: Debra A. Holms, Germantown, WI (US); Rory J. Holms, Germantown, WI (US)

(*) Notice: Subject to any disclaimer, the term of this patent is extended or adjusted under 35 U.S.C. 154(b) by 747 days.

This patent is subject to a terminal disclaimer.

(21) Appl. No.: 11/071,827

(22) Filed: Mar. 3, 2005

(65) Prior Publication Data

US 2006/0196442 A1 Sep. 7, 2006

(51) Int. Cl.
*A01K 63/00* (2006.01)

(52) U.S. Cl. ....... 119/265; 119/245; 119/247; D30/101; D30/107

(58) Field of Classification Search .......... 222/565, 222/462; 215/386, 387, 396, 200, 309, 310; 220/703, 711, 710.5, 713, 212.5; 206/217, 206/457; 119/265; D30/101–107; 239/375–378

See application file for complete search history.

(56) References Cited

U.S. PATENT DOCUMENTS

| | | | |
|---|---|---|---|
| 1,333,454 A | 3/1920 | Sato | |
| 1,838,215 A | 12/1931 | Clairmont | |
| D134,953 S | 2/1943 | Greenberg | |
| D134,954 S | 2/1943 | Greenberg | |
| D134,955 S | 2/1943 | Greenberg | |
| 3,018,758 A | 1/1962 | Arnould | |
| 3,288,110 A | 11/1966 | Goldman et al. | |
| 3,304,912 A | 2/1967 | Hackman et al. | |
| 3,326,185 A | 6/1967 | Perez | |
| D211,953 S | 8/1968 | Whittaker | |
| 3,512,503 A | 5/1970 | Willinger | |
| 3,664,301 A | 5/1972 | Morrill | |
| 3,706,299 A | 12/1972 | Hendges | |
| D238,884 S | 2/1976 | Robert | |
| D239,180 S | 3/1976 | Robert | |
| 3,951,293 A | 4/1976 | Schulz | |
| 4,044,721 A | 8/1977 | Foley et al. | |
| D247,840 S * | 5/1978 | Dixson | D7/510 |
| 4,120,265 A | 10/1978 | Davis | |

(Continued)

FOREIGN PATENT DOCUMENTS

DE 3127653 A1 * 9/1983

OTHER PUBLICATIONS

Collecting Live Specimens, New Jersey Scuba Diver-Marine Biology-Collecting Live Specimens http://www.njscuba.net/gear/misc_catch_live.html [retrieved from internet Feb. 9, 2007] internet archive from Feb. 13, 2005, 5 pages.*

(Continued)

*Primary Examiner* — Andrea M Valenti

(74) *Attorney, Agent, or Firm* — Jansson Shupe & Munger Ltd.

(57) ABSTRACT

A dual-purpose cap for a jar-aquarium comprising a topwall having (a) at least one ingress aperture sized to accept free unbroken water-stream passage therethrough for cap-on filling of the jar-aquarium and (b) at least one egress aperture smaller than the ingress aperture and spaced therefrom to facilitate controlled cap-on out-pouring of water, whereby jar-aquarium water may be changed without removing the cap. A series of egress apertures may be grouped together along the edge of the topwall.

17 Claims, 4 Drawing Sheets

U.S. PATENT DOCUMENTS

| | | | |
|---|---|---|---|
| 4,236,488 | A | 12/1980 | Olds et al. |
| 4,318,945 | A | 3/1982 | Goldman et al. |
| D279,317 | S * | 6/1985 | Goldman et al. ............ D30/106 |
| 4,639,101 | A | 1/1987 | Stefancin, Jr. |
| D294,129 | S | 2/1988 | Grun |
| 4,863,051 | A | 9/1989 | Eibner et al. |
| 4,920,922 | A | 5/1990 | Tominaga |
| 4,961,510 | A * | 10/1990 | Dvoracek ...................... 220/713 |
| 4,974,545 | A | 12/1990 | Jones |
| 5,000,118 | A | 3/1991 | Merritt et al. |
| 5,090,357 | A | 2/1992 | Pucci |
| D327,142 | S | 6/1992 | Pilgrim, Jr. |
| 5,253,781 | A * | 10/1993 | Van Melle et al. ............ 220/713 |
| 5,255,811 | A | 10/1993 | Simon |
| 5,257,596 | A | 11/1993 | Jones |
| D350,626 | S * | 9/1994 | Ross ............................ D30/101 |
| 5,363,801 | A | 11/1994 | Watters et al. |
| 5,365,884 | A | 11/1994 | Jones |
| 5,366,109 | A * | 11/1994 | Proshan ........................ 220/717 |
| 5,407,107 | A * | 4/1995 | Smith ............................ 222/548 |
| 5,451,443 | A | 9/1995 | Wechsler |
| D373,693 | S | 9/1996 | Elhage |
| 5,553,731 | A * | 9/1996 | Schuyler ....................... 220/719 |
| 5,597,228 | A | 1/1997 | Boyle |
| D400,312 | S | 10/1998 | Wing |
| D400,397 | S * | 11/1998 | Stephan .......................... D7/510 |
| D408,226 | S * | 4/1999 | Hollinger ....................... D7/622 |
| 5,894,952 | A * | 4/1999 | Mendenhall et al. ......... 220/713 |
| 5,957,084 | A | 9/1999 | Knepp |
| 6,105,535 | A | 8/2000 | Atamian et al. |
| 6,148,770 | A | 11/2000 | Lin |
| D441,288 | S * | 5/2001 | Pillers et al. .................... D9/434 |
| D449,717 | S | 10/2001 | Fang |
| D450,583 | S * | 11/2001 | Freed .............................. D9/447 |
| 6,327,997 | B1 * | 12/2001 | Terry et al. .................... 119/246 |
| 6,354,246 | B1 | 3/2002 | Kamihata et al. |
| 6,443,099 | B1 | 9/2002 | Boggs |
| D465,732 | S * | 11/2002 | Kick ............................... D9/500 |
| 6,488,173 | B2 * | 12/2002 | Milan ............................ 220/713 |
| 6,536,374 | B1 | 3/2003 | Suerth et al. |
| 6,578,726 | B1 * | 6/2003 | Schaefer ........................ 220/253 |
| 6,665,964 | B2 | 12/2003 | Klotz |
| D490,940 | S * | 6/2004 | Wang ............................ D30/105 |
| 6,755,154 | B1 | 6/2004 | Goldman et al. |
| 6,959,827 | B2 * | 11/2005 | Morano et al. ................. 215/396 |
| D537,675 | S * | 3/2007 | Khalifa ......................... D7/392.1 |
| 2002/0079339 | A1 * | 6/2002 | Sheffler et al. ................. 222/480 |
| 2005/0045647 | A1 * | 3/2005 | Hession et al. ................ 220/714 |
| 2005/0082296 | A1 * | 4/2005 | Pfister et al. ................... 220/507 |
| 2006/0096983 | A1 * | 5/2006 | Patterson ....................... 220/253 |

OTHER PUBLICATIONS

Collecting Live Specimens, New Jersey Scuba Diver-Marine Biology-Collecting Live Specimens http://www.njscuba.net/gear/misc_catch_live.html [retrieved from internet Feb. 9, 2007] www.njscuba.net/biology/aqua_collecting.html internet archive from Mar. 2003, 4 pages.*

Excerpt from auctionworks.com website (5 pages). Dated: Oct. 5, 2004, Sponge Bob, Square pants Betta Tank.

Excerpt from Petco website (2 pages). Dated: Sep. 27, 2004, Lee's Small Round Kritter Keeper.

Excerpt from Petco website (3 pages). Dated: Sep. 27, 2004, Fairly Odd Parents Goldfish Bowl Starter Kit Powered by Tetra.

Excerpt from Taylor Gifts website (4 pages). Dated: Oct. 13, 2004, Office Fish Tank.

Excerpt from Velvet Giraffe website (1 page). Dated: Oct. 5, 2004, Deco Art Betta Fish Tank.

Excerpt from Petco website (2 pages). Dated: Sep. 27, 2004, Sponge Bob SquarePants Bikini Bottom Aquarium Aqua Kit.

Excerpt from Petco website (1 page). Dated: Sep. 27, 2004, Lee's Dual Betta Hex.

* cited by examiner

DUAL-PURPOSE JAR-AQUARIUM

FIELD OF THE INVENTION

This invention relates in general to covers for containers. More particularly, to caps adapted to facilitate watering of plants when emptying used water from readily-portable aquariums and their easy "cap-on" refilling.

BACKGROUND OF THE INVENTION

It is known that aquarium water is rich with nutrients provided by the breakdown product of the fish's metabolism and bacterial breakdown of waste products. The waste aquarium water is found to be highly beneficial as a fertilizer for house-plants. Such nutrient-enriched water can be immediately used for watering plants without aging or special preparation.

To utilize such valuable quality of the aquarium water, it would be preferable to have a cap enclosing the open mouth of a readily-portable jar-aquarium so a small aquatic animal would not slip out while watering house plants directly from the aquarium. Such watering of plants would become easier if the cap was designed for controlled pouring water into a flower-pot.

It would also be highly desirable to have a dual-purpose cap adapted to simplify changing of aquarium water by allowing pouring water out and into the aquarium without taking the cap off.

OBJECTS OF THE INVENTION

It is an object of the invention to provide a dual-purpose cap for a jar-aquarium which permits cap-on emptying and refilling of the aquarium.

Another object of the invention is to provide a dual-purpose cap for a jar-aquarium allowing pouring water directly from the jar-aquarium while preventing escape of the small aquatic animal out with the water.

Another object of the invention is to provide a dual-purpose cap for ajar-aquarium which provides regulation of out-pouring of water.

Yet another object of the invention is to provide a dual-purpose cap for a jar-aquarium designed to accept a through water-stream passage, thus permitting a cap-on filling of the aquarium.

Still another object of the invention is to provide a dual-purpose cap which is held in place when inverted for out-pouring water, but can be taken off for access into aquarium interior.

How these and other objects are accomplished will become apparent from the following descriptions and the drawings.

SUMMARY OF THE INVENTION

This invention, which will be described in detail below, is a dual-purpose cap for a jar-aquarium. The inventive dual-purpose cap comprises a topwall with an edge, the topwall has (a) at least one ingress aperture sized to accept free unbroken water-stream passage therethrough for cap-on filling of the jar-aquarium and (b) at least one egress aperture smaller than the ingress aperture and spaced therefrom to facilitate controlled cap-on out-pouring of water, whereby jar-aquarium water may be changed without removing the cap.

In highly preferred embodiments, there is a series of egress apertures grouped together along the edge. When pouring water out, the egress apertures allow to manage the flow intensity and to direct the out-pouring water.

In certain preferred embodiments the ingress aperture is surrounded by a funnel-shaped portion of the cap to facilitate in-flow of water therethrough.

In some preferred embodiments, the topwall has a concave shape to facilitate in-flow of water through the ingress aperture.

In other preferred embodiments the topwall further includes a funnel disposed surrounding the ingress aperture with a drainage hole adjacent the funnel for a passage of water spilled outside the funnel through the topwall.

The most highly preferred embodiment of this invention involves removable attachment of the cap to the jar-aquarium. The jar-aquarium is a readily-portable container having a bottom wall, a surrounding sidewall, and an open upper end formed by a neck portion; the walls together forming an interior surface defining a water-containing volume.

The term "removable" referring to the cap-container attachment, means that the cap is tightly fastened to the open end of the container and is held in place when inverted withstanding a pressure of the out-pouring water, on the other hand, the cap and container can be disangaged to permit access into the aquarium interior through the open end of the container. Such cap-container connection may be formed by a hitch, threading, snap or frictional (cork type) engagement.

In preferred embodiments just described the open upper end of the container is formed by a neck portion, and the cap has a skirt portion extending from the topwall and sized to receive the neck portion. Both the neck and skirt portions have interlocking members. The term "interlocking members" refers to corresponding parts of the skirt and neck portions which by their interengagement secure the cap with respect to the container and allow their repetitive connection and disconnection.

In the preferred embodiment of this invention, there is a betta fish inside the jar-aquarium.

A desirable embodiment of this invention involves an exterior handle to facilitate lifting and carrying of the jar-aquarium. The handle can be secured either with respect to the container or to the cap.

Throughout this summary section and elsewhere in this specification the term "readily-portable" as used herein refers to jars and the like which may be gripped in a hand in order to pour out and replace the water; one-hand portability depends upon size and whether there is a suitable grip, such as the neck or width of the jar and/or a handle to facilitate pouring.

The term "water-stream" as used herein, means a flow of water running from a liquid carrier into the aquarium. The liquid carrier can be a jug, pitcher and the like or a reservoir of a filter-system dispensing non-chlorinated water through a faucet.

The term "free," referring to the water-stream means that the water is entering the container through the ingress aperture on the cap without aid of an additional device guiding the flow between the liquid carrier and the cap.

The term "unbroken," as used in reference to the water-stream, means that the water flows in a manner of a continuous line which has no gaps or breaks in it.

DETAILED DESCRIPTION OF PREFERRED EMBODIMENTS

Figure 1:
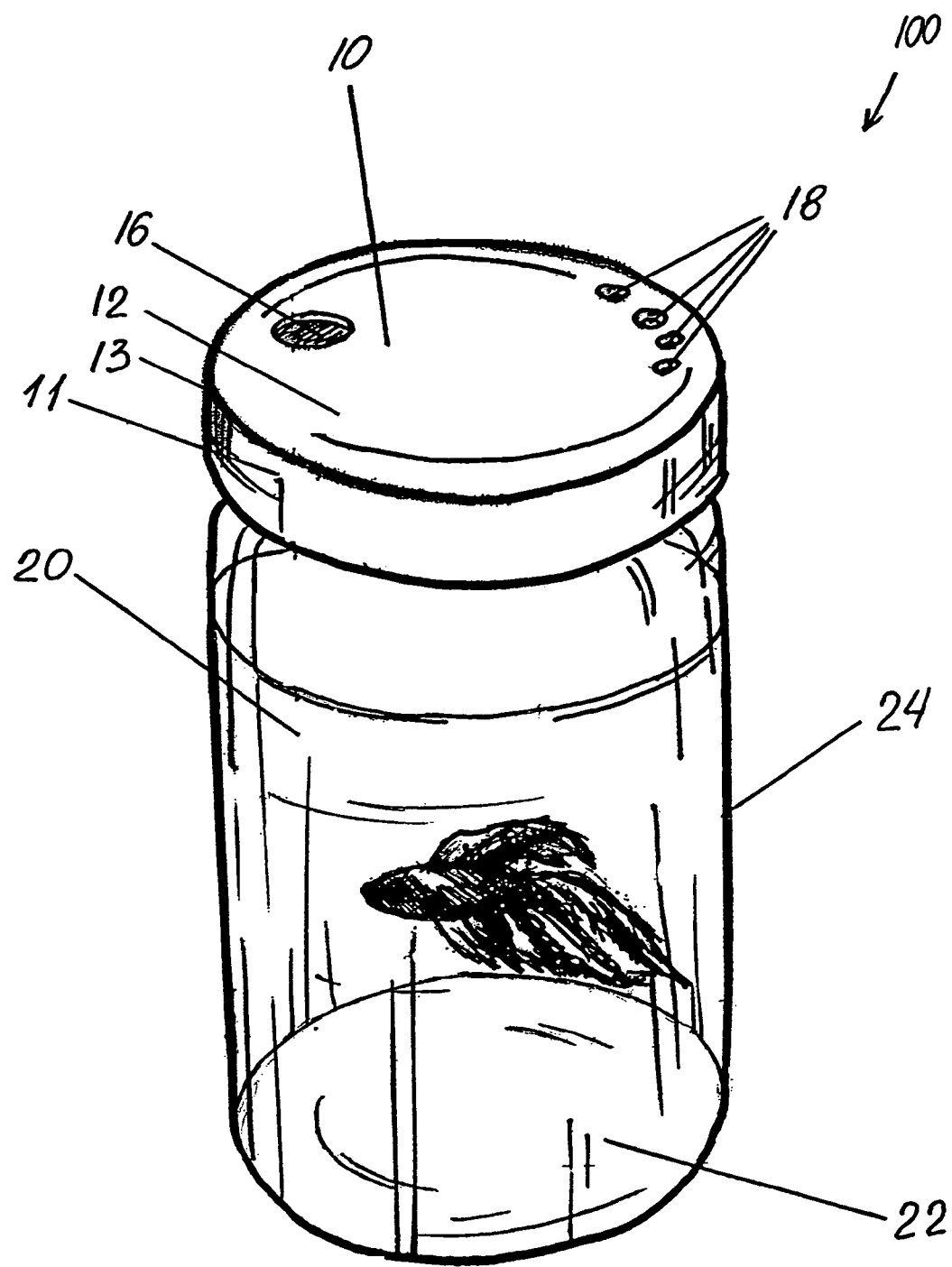
FIG. 1 is a perspective view of the inventive dual-purpose cap attached to the jar-aquarium with a betta fish inside.

Referring to FIGS. 1-5 the inventive dual-purpose cap 10 comprises a topwall 12 with an edge 13, topwall 12 has an ingress aperture 16 and an egress aperture 18. The FIGS. 1-5 show aperture 18 as a series of egress apertures 18 grouped together along edge 13.

Figure 2:
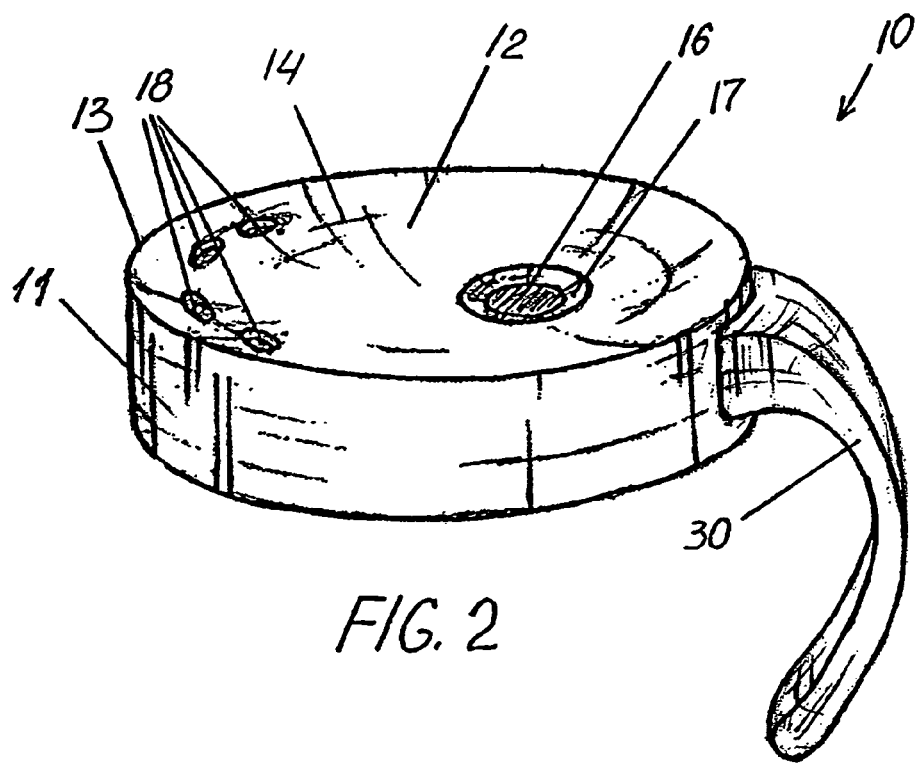
FIG. 2 is a perspective view of a dual-purpose cap of FIG. 1 in accordance with preferred embodiments of the invention and showing the exterior handle secured with respect to the cap.
Figure 3A:
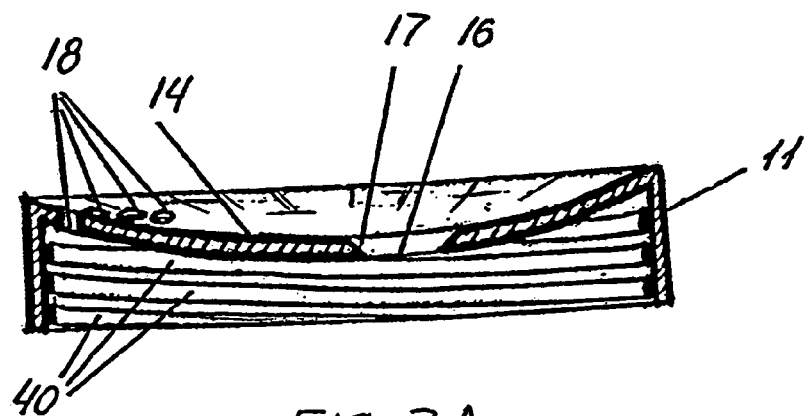
FIG. 3A is a sectional side view of the cap of FIG. 1 showing the topwall having concave shape, the ingress aperture surrounded by a funnel-shaped portion of the cap, and the cap skirt portion having interlocking members.
Figure 3B:
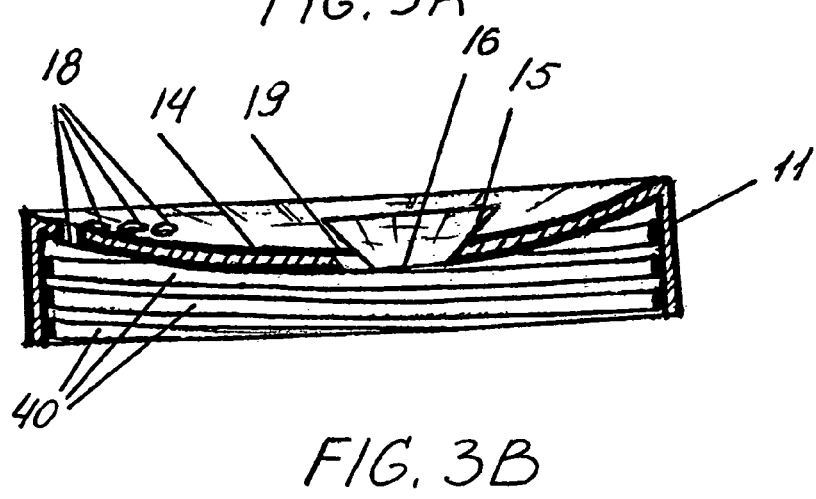
FIG. 3B is a sectional side view of another embodiment of the cap of FIG. 1 showing the topwall having concave shape and including a funnel positioned surrounding the ingress aperture.
Figure 5:
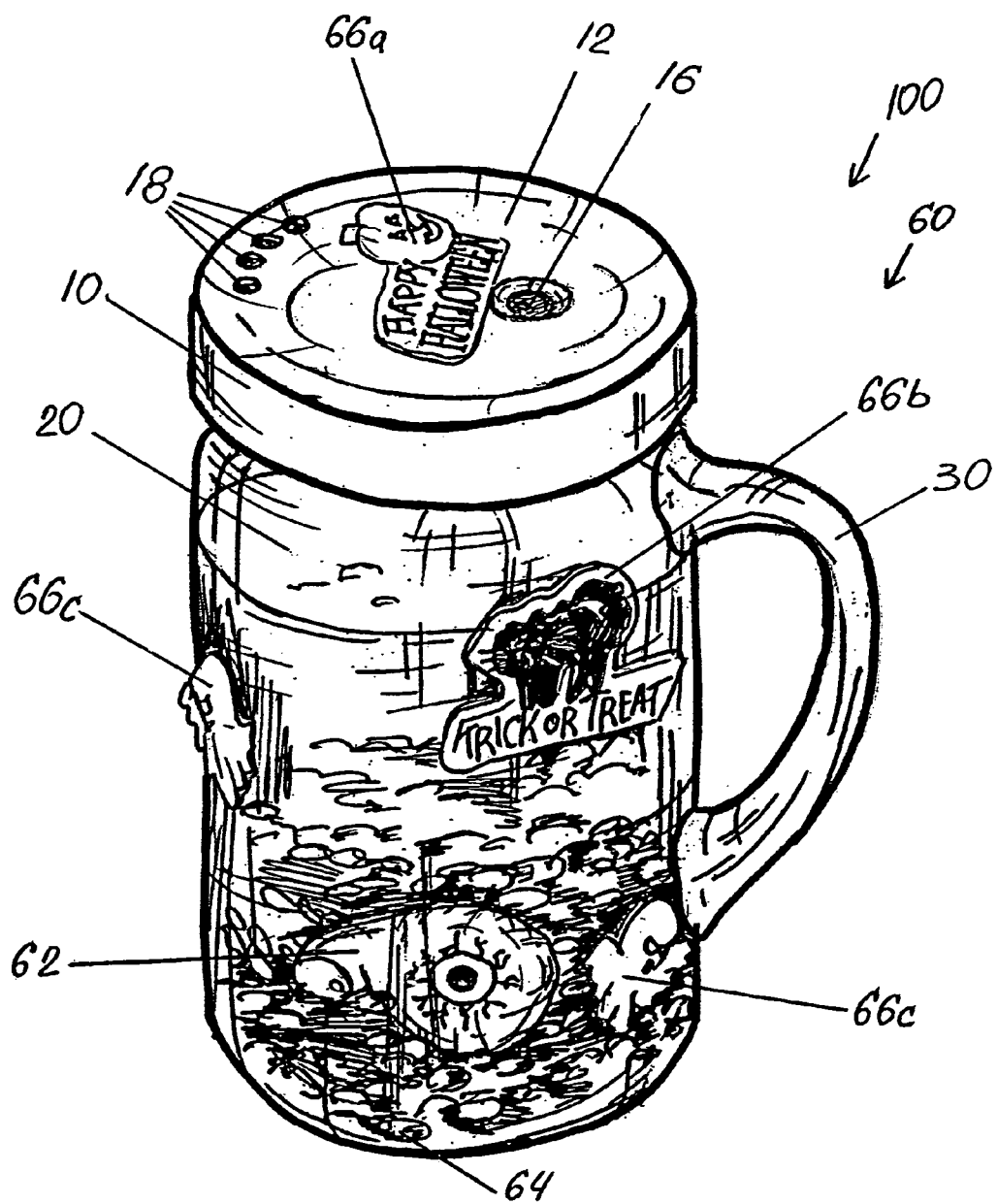
FIG. 5 is a perspective view of another variant of the invention of FIG. 1 showing the dual-purpose cap of FIG. 2 attached to a theme jar-aquarium and showing an exterior handle secured to the container.

FIGS. 2, 3A and 5 show ingress aperture 16 surrounded by a funnel-shaped portion 17 of cap 10 and topwall 12 having a concave shape 14 to facilitate water in-flow through ingress aperture 16 into jar-aquarium 100. Jar-aquarium 100 is a readily-portable container 20 having a bottom wall 22, a surrounding sidewall 24, and an open upper end formed by a neck portion. FIG. 3B illustrates another embodiment having a funnel 15 disposed surrounding ingress aperture 16 with a drainage hole 19 adjacent to funnel 15.

Cap 10 further has a skirt portion 11 extending from topwall 12 and sized to receive neck portion. Skirt portion 11 and neck portion include corresponding interlocking members 40 which, when interengaged, removably secure cap 10 to container 20. FIGS. 3A and 3B best interlocking members 40 in the form of threading on skirt portion 11.

FIG. 2 further illustrates one version of a desired embodiment featuring an exterior handle 30 secured with respect to cap 10.

Figure 4:
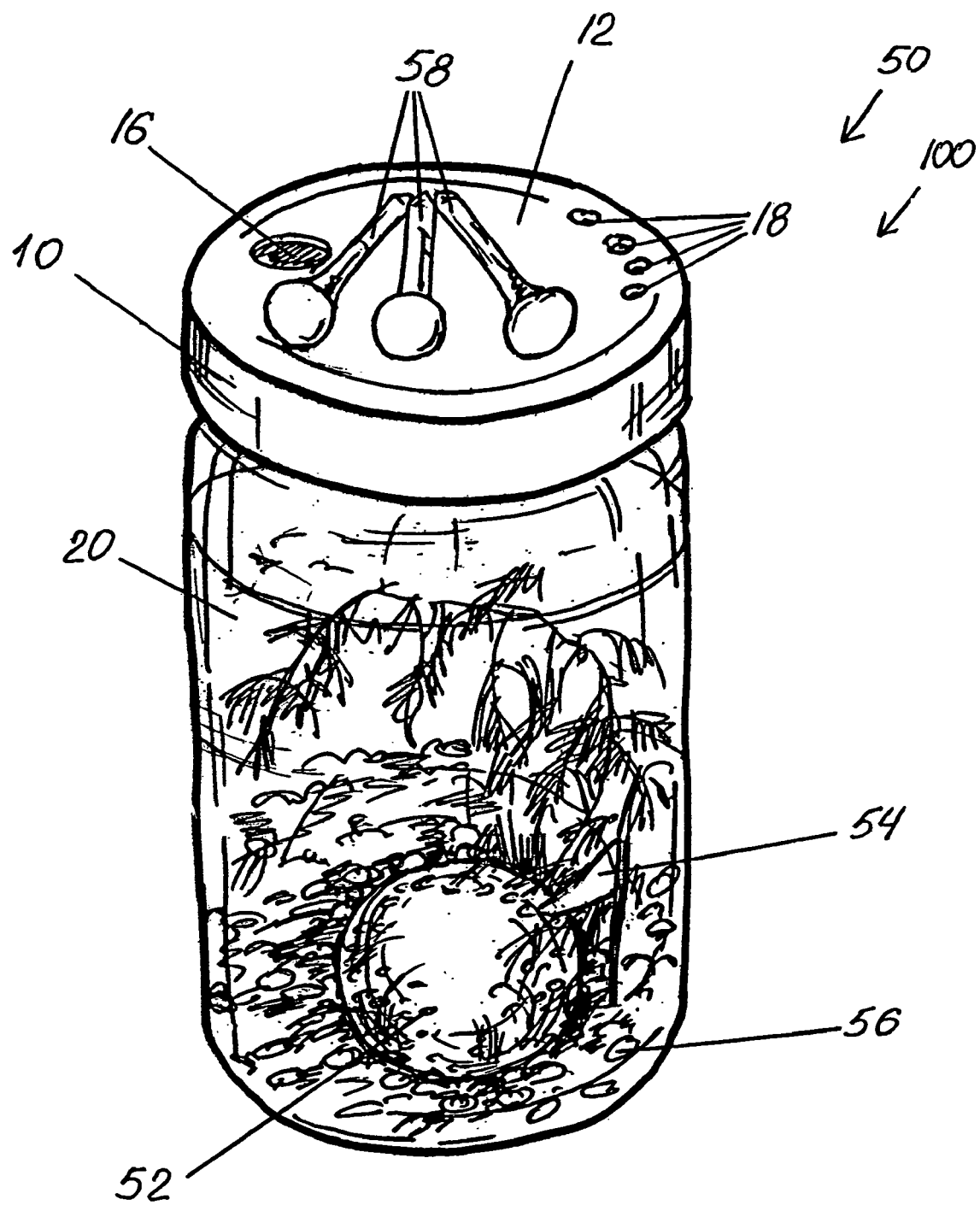
FIG. 4 is a perspective view of a variant of the jar-aquarium with the dual-purpose cap of FIG. 1 having a theme formed by theme-elements, showing some of such theme-elements affixed to the topwall of the cap.

FIG. 4 illustrates jar-aquarium 100 with dual-purpose cap 10 of FIG. 1 having a golfing theme 50 created by internal theme elements as a golf ball 52, a flag-stick 54 and gravel 56, and exterior theme elements such as golf tees 58 adhered to topwall 12 of cap 10. Golf ball 52 and flag-stick 54 are non-removably secured theme elements.

Referring to affixing of a theme element, the term "non-removable" means that position of such theme element may not be changed and the theme element can not be separated from the aquarium. In some cases such non-removable affixing may be in a form of a glue, silicon or similar substance uniting the theme element with the jar-aquarium into a monolithic structure or a theme element may be integrally molded with the aquarium wall.

FIG. 4 shows golf ball 52 molded into bottom wall 22 of container 20 and flag-stick 54 is also non-removably affixed to sidewall 24. As an example of loose internal theme-corresponding elements, FIG. 4 further shows green gravel 56 symbolizing golf green. Golf tees 58 adhered to topwall 32 are just one example of three-dimensional exterior theme elements.

FIG. 5 illustrates dual-purpose cap 10 on jar-aquarium 100 having another possible theme composition 60 related to Halloween. Composition 60 is formed by an eyeball 62 non-removably affixed to bottom wall 22 and black and/or florescent-colored rocks 64 loosely surrounding eyeball 62. Decals 66 with Halloween related images are examples of substantially planar exterior theme elements completing theme composition 60. Image 66a of a pumpkin face wishing "Happy Halloween" is attached to topwall 12 of dual-purpose cap 10 and picture of black cat with "trick or treat" message 66b and ghosts images 66c are placed on exterior of sidewall 24

FIG. 5 further illustrates another version of a desired embodiment having the exterior handle 30 located on sidewall 24 of container 20.

While the principles of the invention have been shown and described in connection with specific embodiments, it is to be understood that such embodiments are by way of example and are not limiting.

The invention claimed is:

1. A dual-purpose jar-aquarium comprising:
   a readily-portable container containing a fish and water enriched by the fish with plant-enhancing nutrients that are products of the fish's metabolism and their bacterial breakdown; and
   a dual-purpose cap removably secured to the container such that it remains in place while the jar-aquarium is inverted, the cap including a single topwall with an edge, the topwall having a non-apertured major topwall portion and a minor topwall portion with a plurality of apertures therethrough, including a sole unobstructed water-ingress aperture sized to accept passage of a free unbroken stream of clean water therethrough for cap-on filling of the jar-aquarium and a grouping of water-egress apertures laterally spaced from the water-ingress aperture, each water-egress aperture smaller than the water-ingress aperture to facilitate controlled cap-on out-pouring of the enriched water, whereby jar-aquarium water may be changed without removing the cap, at least one of the apertures being continuously open.

2. The dual-purpose jar-aquarium of claim 1 wherein the grouping of water-egress apertures is positioned along the edge.

3. The dual-purpose jar-aquarium of claim 1 wherein the ingress aperture is surrounded by a funnel-shaped portion of the cap to facilitate in-flow of water therethrough.

4. The dual-purpose jar-aquarium of claim 1 wherein the topwall has a concave shape to facilitate in-flow of water through the ingress aperture.

5. The dual-purpose jar-aquarium of claim 4 further comprising a funnel disposed surrounding the ingress aperture.

6. The dual-purpose jar-aquarium of claim 5 further including a drainage hole adjacent the funnel.

7. The dual-purpose jar-aquarium of claim 1 further including a handle to facilitate lifting, carrying and pouring water from the jar-aquarium.

8. The dual-purpose jar-aquarium of claim 1 wherein:
   the readily-portable container has a bottom wall and a surrounding sidewall together forming an interior surface defining a water-containing volume, and a neck portion forming the open upper end;
   the cap has a skirt portion extending from the topwall and sized to receive the neck portion; and the neck portion and skirt portion having interlocking members thereon.

9. The dual-purpose jar-aquarium of claim 8 wherein at least one betta fish is inside the container.

10. The dual-purpose jar-aquarium of claim 9 further comprising at least one theme element non-removably secured to the interior surface preventing such element from being disturbed by the out-pouring of water.

11. The dual-purpose jar-aquarium of claim 10 wherein the theme element is secured to the bottom wall.

12. The dual-purpose jar-aquarium of claim 11 including a plurality of the theme elements, at least one of such theme elements being secured to other than the bottom wall.

13. The dual-purpose jar-aquarium of claim 10 wherein at least one such theme element is integral with the container.

14. The dual-purpose jar-aquarium of claim 13 including a plurality of loose theme-corresponding elements inside the container.

15. The dual-purpose jar-aquarium of claim 10 wherein:
the walls together form an outer surface; and
at least one exterior theme element is secured to the outer surface.

16. The dual-purpose jar-aquarium of claim 15 wherein such exterior theme element is a substantially planar image member.

17. The dual-purpose jar-aquarium of claim 15 wherein such exterior theme element is a three-dimensional object.

* * * * *